United States Patent [19]

Schmolka

[11] 3,867,533

[45] Feb. 18, 1975

[54] PREPARATION OF AQUEOUS GEL COMPOSITIONS CONTAINING A WATER-INSOLUBLE ORGANIC INGREDIENT

[75] Inventor: Irving R. Schmolka, Grosse Ile, Mich.

[73] Assignee: BASF Wyandotte Corporation, Wyandotte, Mich.

[22] Filed: Sept. 12, 1973

[21] Appl. No.: 396,349

Related U.S. Application Data

[63] Continuation-in-part of Ser. No. 785,772, Dec. 20, 1968, abandoned.

[52] U.S. Cl.............. 424/258, 424/78, 424/311, 424/318, 424/321, 424/324, 424/347
[51] Int. Cl...... A01n 9/12, A61k 7/00, A61k 27/00
[58] Field of Search............................... 424/78, 258

[56] References Cited
UNITED STATES PATENTS

| | | | |
|---|---|---|---|
| 2,674,619 | 4/1954 | Lundsted | 260/485 |
| 3,639,574 | 2/1972 | Schmocka | 424/78 |
| 3,740,421 | 6/1973 | Schmocka | 424/65 |

*Primary Examiner*—Albert T. Meyers
*Assistant Examiner*—Leonard Schenkman
*Attorney, Agent, or Firm*—Joseph D. Michaels; Bernhard R. Swick; Robert E. Dunn

[57] ABSTRACT

Aqueous gel compositions containing a water-insoluble pharmaceutically or cosmetically active organic ingredient are prepared employing as gelling agents, polyoxyethylene polyoxypropylene block copolymers. The resulting compositions are highly stable and are useful in many pharmaceutical and cosmetic applications.

9 Claims, No Drawings

PREPARATION OF AQUEOUS GEL COMPOSITIONS CONTAINING A WATER-INSOLUBLE ORGANIC INGREDIENT

The present application is a continuation-in-part of copending U.S. Pat. application Ser. No. 785,772, filed Dec. 20, 1968, now abandoned.

Background of The Invention

1. Field of The Invention

The present invention relates to the preparation of aqueous gel compositions containing a water-insoluble organic ingredient. More particularly, the invention relates to the preparation of aqueous gel compositions containing a water-insoluble pharmaceutically or cosmetically active organic ingredient employing as gelling agents certain polyoxyethylene polyoxypropylene block copolymers.

2. Prior Art

The preparation of aqueous gels, employing as gelling agents polyoxyethylene polyoxypropylene block copolymers, is the subject matter of U.S. Pat. No. 3,740,421, issued June 19, 1973. As disclosed therein, these gels may be advantageously employed in the preparation of topically-applicable cosmetic and pharmaceutical compositions. Heretofore, however, when it was desired to prepare a composition containing a water-insoluble organic ingredient, it was found that these compositions could only be obtained if the water-insoluble organic ingredient was initially dissolved in an organic solvent which was miscible with water. One class of solvents commonly employed for this purpose is the lower alkanols, i.e., ethanol and isopropanol. Unfortunately, incorporation of an organic solvent such as an alcohol into a gel composition creates several problems. Oftentimes, the organic solvent will partially evaporate, resulting in a gel of varying composition. In addition, the presence of an organic solvent tends to weaken the yield strength of the gel composition, resulting in liquefaction of the gel.

SUMMARY OF THE INVENTION

It is an object of the present invention to prepare aqueous gel compositions containing a water-insoluble pharmaceutically or cosmetically active organic ingredient. It is a further object of the present invention to prepare gel compositions which are free from organic solvents. Another object of the present invention is to prepare aqueous gel compositions containing a water-insoluble pharmaceutically or cosmetically active organic ingredient employing as gelling agents certain polyoxyethylene polyoxypropylene block copolymers. Still another object of the present invention is to provide aqueous compositions containing a water-insoluble organic ingredient which compositions gel when warm and liquefy when cold. These and other objects of the present invention will be apparent from the specification and examples which follow.

The above objects of the present invention are accomplished by (a) heating a polyoxyethylene polyoxypropylene block copolymer along with a water-insoluble pharmaceutically or cosmetically active organic ingredient to a temperature equal to or greater than the melting point of the copolymer, generally in the range of about 50°C. to 65°C., (b) adding water to the mixture resulting from step (a) and cooling the resulting aqueous mixture to 5°C. to 10°C. with stirring until a homogeneous solution is obtained, and (c) allowing the homogeneous solution to warm to ambient temperatures whereby a gel composition is obtained. The above objects of the present invention may also be accomplished by first heating a polyoxyethylene polyoxypropylene block copolymer to a temperature equal to or greater than the melting point of the copolymer and then adding a water-insoluble pharmaceutically or cosmetically active organic ingredient to the melted copolymer followed by steps (b) and (c), above. The above objects of the present invention may also be achieved by (a) heating a water-insoluble pharmaceutically or cosmetically active organic ingredient, a block copolymer of polyoxyethylene polyoxypropylene and water to 80°C. to 90°C., (b) gently stirring until the block copolymer has dissolved whereby a clear homogeneous solution is obtained, (c) cooling the solution to room temperature, whereby a gel composition is obtained.

DESCRIPTION OF THE PREFERRED EMBODIMENT

As used herein, the term "gel" is defined as a solid or semisolid colloid containing considerable quantities of water. The particles in a gel are linked in a coherent meshwork which immobilizes the water. A colloidal solution with water as the dispersion medium is often called a "hydrosol". The gels within the scope of the present invention are more specifically "ringing" gels and may be described as gels that have a firm jelly-like consistency; that is, by tapping the gel lightly it will vibrate and return to its original configuration.

The polyoxyethylene polyoxypropylene block copolymers which may be employed in the present invention may be represented by the formula:

I. $HO(C_2H_4O)_b(C_3H_6O)_a(C_2H_4O)_bH$ wherein a is an integer such that the hydrophobe represented by $(C_3H_6O)$ has a molecular weight of at least 2250, preferably from 2750 to 4000 and most preferably 4000, and b is an integer such that the hydrophile portion represented by $(C_2H_4O)$ constitutes from about 10 to 90, preferably from 50 to 90 and most preferably from 70 to 90, weight percent of the copolymer.

The hydrophobe of the polyoxyethylene polyoxypropylene block copolymers of formula (I) above is prepared by adding propylene oxide to the two hydroxyl groups of a propylene glycol nucleus. By adding ethylene oxide to the hydrophobe, it is possible to place polyoxyethylene hydrophilic groups on both ends of the molecule. These hydrophilic polyoxyethylene groups may be controlled to constitute anywhere from 10 percent to 90 percent of the final molecule. A more detailed explanation of the preparation of these block copolymers may be found in U.S. Pat. No. 2,674,619.

Illustrative block copolymers of formula (I) above which may be employed in the preparation of the gels of the present invention are presented in Table I.

TABLE I

| Copolymer | Mol. Wt. of Hydrophobe (average) | Wt. % of Hydrophile (average) | Approx. Total Mol. Wt. of Copolymer |
|---|---|---|---|
| A | 2,250 | 50 | 4,600 |
| B | 2,250 | 70 | 7,500 |
| C | 2,250 | 80 | 10,750 |
| D | 2,750 | 45 | 4,910 |

TABLE I-Continued

| Copolymer | Mol. Wt. of Hydrophobe (average) | Wt. % of Hydrophile (average) | Approx. Total Mol. Wt. of Copolymer |
|---|---|---|---|
| E | 2,750 | 60 | 6,450 |
| F | 2,750 | 80 | 13,500 |
| G | 3,250 | 35 | 4,910 |
| H | 3,250 | 45 | 6,050 |
| J | 3,250 | 50 | 6,550 |
| K | 3,250 | 80 | 15,500 |
| L | 4,000 | 15 | 4,710 |
| M | 4,000 | 25 | 5,340 |
| N | 4,000 | 35 | 6,150 |
| P | 4,000 | 70 | 13,500 |
| Q | 4,000 | 80 | 20,000 |

Not all of the block copolymers of the formula

I. $HO(C_2H_4O)_b(C_3H_6O)_a(C_2H_4O)_bH$ may be employed in the present invention. Because of the nature of aqueous solutions of these block copolymers, three variables affect the formation of the gels. Therefore, it is necessary to recognize certain minima for the three variables. These variables are:

1. the weight percent concentration of block copolymers in the gel,
2. the molecular weight of the hydrophobe $(C_3H_6O)_a$, and
3. the weight percent of the hydrophile portion $(C_2H_4O)_b$ of the copolymer.

These minima define a minimum weight percent concentration of the block copolymer with a specific hydrophobe having a minimum weight percent of ethylene oxide that is necessary to form a gel. Thus, at the minimum concentration with a specific molecular weight hydrophobe, a minimum weight percent of ethylene oxide is required before a specific block copolymer will form a gel in an aqueous solution. The minimum weight percent concentrations with specific molecular weight hydrophobes are set out in Table II.

TABLE II

| Mol. Wt. of Hydrophobe | Min. Wt. of Concentration to Form a Gel | Min. wt.% of Ethylene Oxide Required | Total Mol. Wt. of Block Copolymer |
|---|---|---|---|
| 2,250 | 40 | 50 | 4,600 |
| 2,750 | 40 | 45 | 4,910 |
| 2,750 | 30 | 60 | 6,450 |
| 3,250 | 30 | 35 | 4,910 |
| 4,000 | 50 | 15 | 4,710 |
| 4,000 | 30 | 35 | 6,150 |
| 4,000 | 20 | 70 | 13,500 |

In interpreting Table II, it is apparent that at least a 40 percent weight concentration of the block copolymer having a hydrophobe of at least 2,250 molecular weight with at least about 50 weight percent of ethylene oxide condensed therewith will be necessary to form a gel in an aqueous solution. In all cases, the block copolymers above the minima indicated in Table I will form gels in aqueous solutions up to 90 weight percent concentration and higher. Above 90 weight percent concentration, however, the gels tend to become indistinguishable from the starting block copolymer itself. It is to be understood that the molecular weight of the hydrophobe may be other than those illustrated in Table I. Thus, for example, if a hydrophobe of about 2,500 molecular weight is used, it is recognized that a gel may be formed from the block copolymer at a concentration of 40 weight percent in an aqueous solution where about 45 weight percent of ethylene oxide is present in the block copolymer.

From the information presented in Tables I and II, it can be seen that the following provisos must be maintained in order to prepare gel compositions in accordance with the present invention. 1. When a in Formula I is an integer such that the average molecular weight of the hydrophobe is about 2250, then the ethylene oxide content is from 50 to 90 weight percent of the copolymer, the total average molecular weight of the copolymer is from 4600 to 10,750 and the gel composition comprises from 40 to 50 weight percent of the copolymer;

2. When a in Formula I is an integer such that the average molecular weight of the hydrophobe is about 2750, then the ethylene oxide content is from 45 to 90 weight percent of the copolymer, the total average molecular weight of the copolymer is from 4910 to 13,500 and the gel composition comprises from 40 to 50 weight percent of the copolymer;

3. When a in Formula I is an integer such that the average molecular weight of the hydrophobe is about 3250, then the ethylene oxide content is from 35 to 90 weight percent of the copolymer, the total average molecular weight of the copolymer is from 4910 to 15,510 and the gel composition comprises from 30 to 50 weight percent of the copolymer;

4. When a in Formula I is an integer such that the average molecular weight of the hydrophobe is about 4000, then the ethylene oxide content is from 35 to 90 weight percent of the copolymer, the total average molecular weight of the copolymer is from 6150 to 2000 and the gel composition comprises from 30 to 50 weight percent of the copolymer, with the further proviso that when a in Formula I is an integer such that the average molecular weight of the hydrophobe is about 4000 the ethylene oxide content is from 70 to 90 weight percent, the total average molecular weight of the block polymer is from 16,000 to 20,000 and the gel composition comprises from 15 to 50 weight percent of the copolymer.

The technical explanation for the formation of the gels of the invention is not entirely understood, and the explanation hereinafter is not to be considered as being limitative of the invention. However, the behavior of these block copolymers in forming the gels is believed to be explained on the basis of hydrate formation. It may be speculated that the hydrophobe, because it is different from the hydrophobe of other types of nonionics, may, in its own right, immobilize the water independently of the oxyethylene chain by hydrogen bonding. It is noteworthy that gel formation occurs at about 70°F. to 80°F., even where the block copolymer contains more than 200 moles of ethylene oxide or over 100 moles per block. It is also believed that the nature of the block copolymer adds to this phenomenon. It should be noted that the block copolymer used in the gels of this invention exhibits a hydrophobe lying between two equal hydrophiles, whereas nonionics commonly encountered, such as the oxyethylated fatty alcohols and alkyl phenols, have only one hydrophile chain. This difference in structure suggests that a loose micellar structure is obtained with this class of nonionics and that gel formation would more readily involve entrapment of free water in addition to water due to hydrogen bonding.

The compositions prepared in accordance with the present invention generally comprise (1) a pharmaceutically or cosmetically effective amount of water-insoluble organic ingredient and (2) as a matrix therefor, an aqueous gel comprising, based on 100 parts by weight, (a) from 15 to 50 parts, preferably from 15 to 25 parts, of a polyoxyethylene polyoxypropylene block copolymer and (b) from 50 to 85 parts, preferably from about 75 to 85 parts, of water. By the phrase "pharmaceutically or cosmetically effective amount" as used herein is meant the amount of organic ingredient required to prepare a pharmaceutical or cosmetical active composition. Generally, this amount is from about 0.1 parts to 10 parts, preferably from 0.5 to 5 parts, by weight of an organic ingredient based on 100 parts of the total composition.

Numerous water-insoluble pharmaceutically or cosmetically active organic ingredients may be employed in the preparation of the compositions in accordance with the present invention. The particular organic ingredient employed will depend solely on the composition desired. Thus, if a cosmetic composition is desired, then the organic ingredient will be one having cosmetic properties. Representative water-insoluble organic ingredients which may be employed in the present invention include germicides, insecticides, fungicides and bactericides such a N,N-diethyl-m-toluamide, N,N-dipropyl-2-[.(p-methoxybenzyl)-oxy]-acetamide, bithionol, 3,4,4′-trichlorocarbanilide, hexachlorophene, 8-hydroxyquinoline, undecylenic acid and hexahydro-3a,7a-dimethyl-4,7-epoxyisobenzofuran-1,3-dione; anesthetics such as p-aminobenzoyl diethylamino-ethanol; anthelmintics such as phenothiazine; foam stabilizers such as lauric isopropanolamide, myristic isopropanolamide, lauric diethanolamide; emollients such as polyoxypropylene glycol oleate, lauryl lactate, cetyl lactate, decyl oleate and myristic lactate; sun screen agents such as dipropylene glycol salicylate, isopropyl p-aminobenzoate, propylene glycol aminobenzoate, monoglyceryl p-aminobenzoate, benzyl salicylate, benzyl cinnamate, amyl-p-dimethylaminobenzoate and ethoxyethyl p-methoxycinnamate; perfumes and oils such as oil of wintergreen, eucalyptus oil, oil myristica, oil of cedar, camphor, phenyl ethylalcohol and benzylalcohol. The above list is merely representative of the many water-insoluble organic ingredients which may be employed in the present invention. It is clear that the particular organic ingredient selected will depend upon the desired use of the composition.

The following examples illustrate the nature of the present invention. All parts are by weight unless otherwise stated.

EXAMPLE I

A topically-applicable gel composition useful as an insect repellant was prepared from the following ingredients:

| parts | |
|---|---|
| 15 | Compolymer P |
| 3 | N,N-diethyltoluamide |
| 82 | Water |

Copolymer P is a 13,500 molecular weight block copolymer of formula (I) having a hydrophobe average molecular weight of 4000 and a hydrophile constituting 70 percent weight of ethylene oxide based on the total weight of the copolymer.

The composition was prepared by blending Copolymer P with N,N-diethyltoluamide and heating the blend to 60°C. whereby a molten mixture was obtained. With good stirring, water was added to the molten mixture while cooling to 5°–10°C. Stirring continued until a homogeneous solution was obtained at which time the solution was allowed to warm to room temperature. A clear, ringing gel composition resulted. The composition remained clear for over six months. Furthermore, it maintained its gel strength. A composition was prepared as described with the single exception that isopropanol was employed as a solubilizer for N,N-diethyltoluamide. Within days, the alcohol began to evaporate leaving an opaque milky upper layer.

EXAMPLE II

Following the procedure of Example I, the following gel compositions were prepared:

| (A) | Ingredients | Parts |
|---|---|---|
| | Copolymer P | 20 |
| | Undecylenic acid | 1 |
| | Water | 79 |
| (B) | Ingredients | Parts |
| | Copolymer P | 20.0 |
| | 8-Hydroxyquinoline | 0.3 |
| | Water | 79.7 |
| (C) | Ingredients | Parts |
| | Copolymer P | 20 |
| | 2-Ethoxyethyl p-methoxy-cinnamate | 1.5 |
| | Water | 78.5 |
| (D) | Ingredients | Parts |
| | Copolymer P | 20 |
| | Lauryl lactate | 1 |
| | Water | 79 |

All four compositions were clear, stable gels free of organic solvents. Composition A was useful as a fungistat, Composition B was useful in the treatment of athlete's foot, Composition C was useful as a sun screen gel, and Composition D was useful as an emollient cream.

EXAMPLE III

A germicidal gel composition useful in the treatment of skin bacteria was prepared from the following ingredients:

| Parts | |
|---|---|
| 18 | copolymer P |
| 3 | Hexachlorophene |
| 79 | Water |

Copolymer P is a 13,500 molecular weight block copolymer of formula (I) having a hydrophobe average molecular weight of 4000 and a hydrophile constituting 70 percent by weight of ethylene oxide based on the total weight of the copolymer.

The composition was prepared by first heating Copolymer P to 60°C. and adding the hexachlorophene to the melted copolymer. With constant stirring, the water was slowly added to the mixture of copolymer and hexachlorophene while cooling to 5°C. Stirring continued until a homogeneous solution resulted, at which time the solution was allowed to warm to room temperature. A clear, ringing gel composition resulted which retained its transparent property for over six months.

The above procedure was duplicated employing 19 parts of Copolymer P, 1 part of p-toluene sulfonamide, and 80 parts of water. A clear ringing gel composition was obtained.

EXAMPLE IV

A gel composition useful in the treatment of athlete's foot is prepared in the manner described in Example I from the following ingredients:

| Parts | |
|---|---|
| 30.0 | Copolymer K |
| 0.35 | 8-Hydroxyquinoline |
| 69.65 | Water |

Copolymer K is a 15,500 average molecular weight block copolymer of formula (I) having a hydrophobe average molecular weight of 3250 and a hydrophile constituting about 80 percent by weight of the copolymer.

The resulting transparent gel exhibits properties substantially similar to those described in Example I.

EXAMPLE V

A gel composition useful as a deodorant is prepared in the manner described in Example III from the following ingredients:

| Parts | |
|---|---|
| 40.0 | Copolymer J |
| 1.0 | Hexachlorophene |
| 59.0 | Water |

Copolymer J is a 6550 average molecular weight block copolymer of formula (I) having a hydrophobe average molecular weight of 3250 and a hydrophile constituting about 50 percent weight of the copolymer.

The resulting transparent gel exhibits properties substantially similar to those described in Example III.

EXAMPLE VI

A sun screen gel was prepared from the following ingredients:

| Parts | |
|---|---|
| 19 | Copolymer P |
| 1 | Amyl-p-dimethylaminobenzoate |
| 80 | Water |

Copolymer P is a 13,500 molecular weight block copolymer of formula (I) having a hydrophobe average molecular weight of 4000 and a hydrophile constituting 70 percent by weight of ethylene oxide based on the total weight of the copolymer.

The composition was prepared by heating all three ingredients to 85°C. and gently mixing the ingredients at this temperature until a clear homogeneous solution was obtained. The solution was then allowed to cool to room temperature whereby a clear ringing gel was obtained. The gel retained its transparent property for over six months.

EXAMPLE VII

A number of gel compositions were prepared by heating all ingredients to about 80°C. and gently mixing the ingredients at this temperature until a clear homogeneous solution was obtained. The solution was then allowed to cool to room temperature whereby a gel composition was obtained. In all cases, the resulting gel compositions remained stable over a period of months. The particular compositions prepared are presented in Table III, below. In the examples presented in the Table, Copolymer P was employed as the block copolymer.

TABLE III

| Copolymer P Parts | Water Parts | Organic Ingredient, Parts | |
|---|---|---|---|
| 15 | 82 | P-toluidine | 3 |
| 16 | 82 | Oil of wintergreen | 2 |
| 16 | 82 | Eucalyptus oil | 2 |
| 15 | 83 | Oil myristica | 2 |
| 15 | 83 | Oil of cedar | 2 |
| 15 | 83 | Camphor | 2 |
| 15 | 82 | Cetyl lactate | 3 |
| 16 | 82 | Decyl oleate | 2 |

The embodiments of the invention in which an exclusive property or privilege is claimed are defined as follows:

1. A method of preparing an aqueous gel composition containing a water-insoluble pharmaceutically or cosmetically active organic ingredient which comprises the following steps:

a. heating from 0.1 part to 10 parts by weight of said organic ingredient along with from 50 parts to 15 parts by weight of a polyoxyethylene polyoxypropylene block copolymer to a temperature of about 50°C. to 65°C., said copolymer having the formula:
$$HO(C_2H_4O)_b(C_3H_6O)_a(C_2H_4O)_bH$$
wherein $a$ is an integer such that the hydrophobe represented by $(C_3H_6O)$ has a molecular weight of from 2250 to 4000, and $b$ is an integer such that the hydrophile portion represented by $(C_2H_4O)$ constitutes from about 10 to 90 weight percent of the copolymer, b. adding from 50 parts to 85 parts by weight of water to the mixture resulting from step (a) and cooling the resulting aqueous mixture to 5°C. to 10°C. with stirring until a homogeneous solution is obtained, and c. allowing the homogeneous solution from step (b) to warm to ambient temperatures whereby a gel composition is obtained, with the provisos that:

1. when $a$ in Formula I is an integer such that the average molecular weight of the hydrophobe is about 2250, then the ethylene oxide content is from 50 to 90 weight percent of the copolymer, the total average molecular weight of the copolymer is from 4600 to 10,750 and the gel composition comprises from 40 to 50 weight percent of the copolymer;

2. when $a$ in Formula I is an integer such that the average molecular weight of the hydrophobe is about 2750, then the ethylene oxide content is from 45 to 90 weight percent of the copolymer, the total average molecular weight of the copolymer is from 4910 to 13,500 and the gel composition comprises from 40 to 50 weight percent of the copolymer;

3. when $a$ in Formula I is an integer such that the average molecular weight of the hydrophobe is about 3250, then the ethylene oxide content is from 35 to 90 weight percent of the copolymer, the total average molecular weight of the copolymer is from 4910 to 15,510 and the gel composition comprises from 30 to 50 weight percent of the copolymer;

4. when $a$ in Formula I is an integer such that the average molecular weight of the hydrophobe is about 4000, then the ethylene oxide content is from 35 to 90 weight percent of the copolymer, the total average molecular weight of the copolymer is from 6150 to 2000 and the gel composition comprises from 30 to 50 weight percent of the copolymer, with the further proviso that when $a$ in Formula I is an integer such that the average molecular weight of the hydrophobe is about 4000, the ethylene oxide content is from 70 to 90 weight percent, the total average molecular weight of the block polymer is from 16,000 to 20,000 and the gel composition comprises from 15 to 50 weight percent of the copolymer, all parts by weight being based on 100 parts by weight of said gel composition.

2. A method of preparing an aqueous gel composition containing a water-insoluble pharmaceutically or cosmetically active organic ingredient which comprises the following steps:

a. heating from 50 parts to 15 parts of polyoxyethylene polyoxypropylene block copolymer to a temperature of about 50°C. to 65°C., said copolymer having the formula:

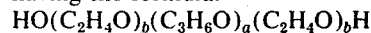

wherein $a$ is an integer such that the hydrophobe represented by $(C_3H_6O)$ has a molecular weight of at least 2250, and $b$ is an integer such that the hydrophile portion represented by $(C_2H_4O)$ constitutes from about 10 to 90 weight percent of the copolymer, b. adding from 0.1 part to 10 parts of said organic ingredient to the melted copolymer from step (a), c. adding from 50 parts to 85 parts of water to the mixture resulting from step (b) and cooling the resulting aqueous mixture to 5°C. to 10°C. with stirring until a homogeneous solution is obtained, and d. allowing the homogeneous solution from step (c) to warm to ambient temperatures whereby a gel composition is obtained, with the provisos that:

1. when $a$ in Formula I is an integer such that the average molecular weight of the hydrophobe is about 2250, then the ethylene oxide content is from 50 to 90 weight percent of the copolymer, the total average molecular weight of the copolymer is from 4600 to 10,750 and the gel composition comprises from 40 to 50 weight percent of the copolymer;

2. when $a$ in Formula I is an integer such that the average molecular weight of the hydrophobe is about 2750, then the ethylene oxide content is from 45 to 90 weight percent of the copolymer, the total average molecular weight of the copolymer is from 4910 to 13,500 and the gel composition comprises from 40 to 50 weight percent of the copolymer;

3. when $a$ in Formula I is an integer such that the average molecular weight of the hydrophobe is about 3250, then the ethylene oxide content is from 35 to 90 weight percent of the copolymer, the total average molecular weight of the copolymer is from 4910 to 15,510 and the gel composition comprises from 30 to 50 weight percent of the copolymer;

4. when $a$ in Formula I is an integer such that the average molecular weight of the hydrophobe is about 4000, then the ethylene oxide content is from 35 to 90 weight percent of the copolymer, the total average molecular weight of the copolymer is from 6150 to 2000 and the gel composition comprises from 30 to 50 weight percent of the copolymer, with the further proviso that when $a$ in Formula I is an integer such that the average molecular weight of the hydrophobe is about 4000, the ethylene oxide content is from 70 to 90 weight percent, the total average molecular weight of the block polymer is from 16,000 to 20,000 and the gel composition comprises from 15 to 50 weight percent of the copolymer, all parts by weight being based on 100 parts by weight of said gel composition.

3. A method of preparing an aqueous gel composition containing a water-insoluble pharmaceutically or cosmetically active organic ingredient which comprises the following steps:

a. heating from 0.1 part to 10 parts of said organic ingredient, 50 parts to 85 parts of water and from 50 parts to 15 parts of a polyoxyethylene polyoxypropylene block copolymer to a temperature of 80°C. to 90°C., said copolymer having the formula:

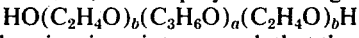

wherein $a$ is an integer such that the hydrophobe represented by $(C_3H_6O)$ has a molecular weight of at least 2250, and $b$ is an integer such that the hydrophile portion represented by $(C_2H_4O)$ constitutes from about 10 to 90 weight percent of the copolymer, b. gently stirring the mixture from step (a) until the block copolymer has dissolved whereby a clear homogeneous solution is obtained and c. cooling the homogeneous solution from step (b) to room temperature whereby a gel composition is obtained, with the provisos that:

1. when $a$ in Formula I is an integer such that the average molecular weight of the hydrophobe is about 2250, then the ethylene oxide content is from 50 to 90 weight percent of the copolymer, the total average molecular weight of the copolymer is from 4600 to 10,750 and the gel composition comprises from 40 to 50 weight percent of the copolymer;

2. when $a$ in Formula I is an integer such that the average molecular weight of the hydrophobe is about 2750, then the ethylene oxide content is from 45 to 90 weight percent of the copolymer, the total average molecular weight of the copolymer is from 4910 to 13,500 and the gel composition comprises from 40 to 50 weight percent of the copolymer;

3. when $a$ in Formula I is an integer such that the average molecular weight of the hydrophobe is about 3250, then the ethylene oxide content is from 35 to 90 weight percent of the copolymer, the total average molecular weight of the copolymer is from 4910 to 15,510 and the gel composition comprises from 30 to 50 weight percent of the copolymer;

4. when $a$ in Formula I is an integer such that the average molecular weight of the hydrophobe is about 4,000, then the ethylene oxide content is from 35 to 90 weight percent of the copolymer, the total average molecular weight of the copolymer is from 6150 to 2000 and the gel composition comprises from 30 to 50 weight percent of the copolymer, with the further proviso that when $a$ in Formula I is an integer such that the average molecular weight of the hydrophobe is about 4000, the ethylene oxide content is from 70 to 90 weight percent, the total average molecular weight of the block polymer is from 16,000 to 20,000 and the gel composition comprises from 15 to 50 weight percent of the copolymer, all parts by weight being based on 100 parts by weight of said gel composition.

4. The method of claim 1 wherein the polyoxyethylene polyoxypropylene block copolymer has an average molecular weight hydrophobe of 4000 and the hydrophile portion of the copolymer constitutes from 70 to 90 weight percent of the copolymer.

5. The method of claim 2 wherein the polyoxyethylene polyoxypropylene block copolymer has an average molecular weight hydrophobe of 4000 and the hydrophile portion of the copolymer constitutes from 70 to 90 weight percent of the copolymer.

6. The method of claim 3 wherein the polyoxyethylene polyoxypropylene block copolymer has an average molecular weight hydrophobe of 4000 and the hydrophile portion of the copolymer constitutes from 70 to 90 weight percent of the copolymer.

7. The method of claim 1 wherein the water-insoluble ingredient is selected from the group consisting of N,N-diethyltoluamide, undecylenic acid, lauryl lactate, hexachlorophene, p-toluene sulfonamide and 8-hydroxyquinoline.

8. The method of claim 2 wherein the water-insoluble ingredient is selected from the group consisting of N,N-diethyltoluamide, undecylenic acid, lauryl lactate, hexachlorophene, p-toluene sulfonamide and 8-hydroxyquinoline.

9. The method of claim 3 wherein the water-insoluble ingredient is selected from the group consisting of N,N-diethyltoluamide, undecylenic acid, lauryl lactate, hexachlorophene, p-toluene sulfonamide and 8-hydroxyquinoline.

* * * * *